United States Patent
Oliver et al.

(10) Patent No.: US 10,027,611 B2
(45) Date of Patent: *Jul. 17, 2018

(54) METHOD AND APPARATUS FOR CLASSIFYING ELECTRONIC MESSAGES

(71) Applicant: SONICWALL US HOLDINGS INC., Santa Clara, CA (US)

(72) Inventors: Jonathan J. Oliver, San Carlos, CA (US); David A. Koblas, Los Altos, CA (US); Brian K. Wilson, Palo Alto, CA (US)

(73) Assignee: SonicWALL Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/074,788

(22) Filed: Mar. 18, 2016

(65) Prior Publication Data

US 2016/0205050 A1    Jul. 14, 2016

Related U.S. Application Data (63) Continuation of application No. 14/152,812, filed on Jan. 10, 2014, now Pat. No. 9,325,649, which is a continuation of application No. 13/360,971, filed on Jan. 30, 2012, now Pat. No. 8,688,794, which is a continuation of application No. 11/903,413, filed on Sep. 20, 2007, now Pat. No. 8,112,486, which is a continuation of application No. 10/371,977, filed on Feb. 20, 2003, now Pat. No. 7,299,261.

(51) Int. Cl.
*H04L 12/58* (2006.01)
*G06Q 10/10* (2012.01)

(52) U.S. Cl.
CPC ......... *H04L 51/063* (2013.01); *G06Q 10/107* (2013.01); *H04L 51/12* (2013.01); *H04L 51/34* (2013.01)

(58) Field of Classification Search
CPC ......... H04L 51/12; H04L 51/28; H04L 51/34; H04L 51/22; H04L 51/063
See application file for complete search history.

(56) References Cited

U.S. PATENT DOCUMENTS 5,905,777 A     5/1999  Foladare et al.
5,960,383 A  *  9/1999  Fleischer .............. G06F 17/277
                                                        704/9

(Continued)

FOREIGN PATENT DOCUMENTS

WO    WO 2004/075029    9/2004

OTHER PUBLICATIONS

"Active SMTP White Paper," ESCOM Corp. (author unknown), 2000, 11 pp.

(Continued)

*Primary Examiner* — Ramy M Osman
(74) *Attorney, Agent, or Firm* — Polsinelli LLP (57) ABSTRACT

Systems and methods for processing a message are provided. A message may be processed to generate a message summary by removing or replacing certain words, phrases, sentences, punctuation, and the like. Message signatures based upon the message summary may be generated and stored in a signature database, which may be used to identify and/or classify spam messages. Subsequently received messages may be classified by signature and processed based on classification.

20 Claims, 4 Drawing Sheets

(56) References Cited

U.S. PATENT DOCUMENTS

| | | |
|---|---|---|
| 5,999,929 A | 12/1999 | Goodman |
| 6,023,723 A * | 2/2000 | McCormick ............ H04L 51/12 707/999.001 |
| 6,052,709 A | 4/2000 | Paul |
| 6,072,942 A | 6/2000 | Stockwell et al. |
| 6,076,101 A | 6/2000 | Kamakura et al. |
| 6,112,227 A | 8/2000 | Heiner |
| 6,161,130 A | 12/2000 | Horvitz et al. |
| 6,199,102 B1 | 3/2001 | Cobb |
| 6,222,942 B1 * | 4/2001 | Martin ................... H03M 7/42 345/555 |
| 6,234,802 B1 | 5/2001 | Pella et al. |
| 6,266,692 B1 | 7/2001 | Greenstein |
| 6,330,590 B1 | 12/2001 | Cotton |
| 6,373,985 B1 | 4/2002 | Hu et al. |
| 6,421,709 B1 | 7/2002 | McCormick et al. |
| 6,424,997 B1 | 7/2002 | Buskirk, Jr. et al. |
| 6,438,690 B1 | 8/2002 | Patel et al. |
| 6,453,327 B1 | 9/2002 | Nielsen |
| 6,539,092 B1 | 3/2003 | Kocher |
| 6,546,416 B1 | 4/2003 | Kirsch |
| 6,549,957 B1 | 4/2003 | Hanson et al. |
| 6,591,291 B1 | 7/2003 | Gabber et al. |
| 6,615,242 B1 | 9/2003 | Riemers |
| 6,615,348 B1 | 9/2003 | Gibbs |
| 6,621,930 B1 * | 9/2003 | Smadja ............ G06F 17/30707 358/403 |
| 6,640,301 B1 | 10/2003 | Ng |
| 6,643,686 B1 | 11/2003 | Hall |
| 6,650,890 B1 | 11/2003 | Irlam et al. |
| 6,654,787 B1 | 11/2003 | Aronson et al. |
| 6,691,156 B1 | 2/2004 | Drummond et al. |
| 6,708,205 B2 | 3/2004 | Sheldon et al. |
| 6,728,378 B2 | 4/2004 | Garib |
| 6,732,149 B1 | 5/2004 | Kephart |
| 6,772,196 B1 | 8/2004 | Kirsch et al. |
| 6,778,941 B1 | 8/2004 | Worrell et al. |
| 6,779,021 B1 | 8/2004 | Bates et al. |
| 6,816,884 B1 | 11/2004 | Summers |
| 6,829,635 B1 | 12/2004 | Townsend |
| 6,842,773 B1 | 1/2005 | Ralston et al. |
| 6,851,051 B1 | 2/2005 | Bolle et al. |
| 6,868,498 B1 | 3/2005 | Katsikas |
| 6,876,977 B1 | 4/2005 | Marks |
| 6,931,433 B1 | 8/2005 | Ralston et al. |
| 6,941,348 B2 | 9/2005 | Petry et al. |
| 6,944,772 B2 | 9/2005 | Dozortsev |
| 6,952,719 B1 * | 10/2005 | Harris .................. H04L 51/12 709/206 |
| 6,963,928 B1 | 11/2005 | Bagley et al. |
| 6,965,919 B1 | 11/2005 | Woods et al. |
| 7,003,555 B1 | 2/2006 | Jungck |
| 7,003,724 B2 | 2/2006 | Newman |
| 7,006,993 B1 | 2/2006 | Cheong et al. |
| 7,016,875 B1 | 3/2006 | Steele et al. |
| 7,016,877 B1 | 3/2006 | Steele et al. |
| 7,032,114 B1 | 4/2006 | Moran |
| 7,072,942 B1 * | 7/2006 | Maller .................. H04L 51/12 709/206 |
| 7,076,241 B1 | 7/2006 | Zondervan |
| 7,103,599 B2 | 9/2006 | Buford et al. |
| 7,117,358 B2 * | 10/2006 | Bandini .................. H04L 51/12 380/259 |
| 7,127,405 B1 | 10/2006 | Frank et al. |
| 7,149,778 B1 | 12/2006 | Patel et al. |
| 7,162,413 B1 | 1/2007 | Johnson et al. |
| 7,171,450 B2 | 1/2007 | Wallace et al. |
| 7,178,099 B2 | 2/2007 | Meyer et al. |
| 7,206,814 B2 | 4/2007 | Kirsch |
| 7,216,233 B1 | 5/2007 | Krueger |
| 7,222,157 B1 | 5/2007 | Sutton, Jr. et al. |
| 7,231,428 B2 | 6/2007 | Teague |
| 7,249,175 B1 | 7/2007 | Donaldson |
| 7,293,063 B1 | 11/2007 | Sobel |
| 7,299,261 B1 | 11/2007 | Oliver et al. |
| 7,366,919 B1 | 4/2008 | Sobel et al. |
| 7,392,280 B2 | 6/2008 | Rohall et al. |
| 7,406,502 B1 | 7/2008 | Oliver et al. |
| 7,472,163 B1 | 12/2008 | Ben-Yoseph et al. |
| 7,539,726 B1 | 5/2009 | Wilson et al. |
| 7,562,122 B2 | 7/2009 | Oliver et al. |
| 7,580,982 B2 | 8/2009 | Owen et al. |
| 7,693,945 B1 | 4/2010 | Dulitz et al. |
| 7,711,669 B1 | 5/2010 | Liu et al. |
| 7,711,786 B2 | 5/2010 | Zhu |
| 7,725,475 B1 | 5/2010 | Alspector et al. |
| 7,725,544 B2 | 5/2010 | Alspector et al. |
| 7,827,190 B2 | 11/2010 | Pandya |
| 7,836,061 B1 | 11/2010 | Zorky |
| 7,873,996 B1 | 1/2011 | Emigh et al. |
| 7,877,807 B2 | 1/2011 | Shipp |
| 7,882,189 B2 | 2/2011 | Wilson |
| 8,010,614 B1 | 8/2011 | Musat et al. |
| 8,046,832 B2 | 10/2011 | Goodman et al. |
| 8,091,129 B1 | 1/2012 | Emigh et al. |
| 8,108,477 B2 | 1/2012 | Oliver et al. |
| 8,112,486 B2 | 2/2012 | Oliver et al. |
| 8,180,837 B2 | 5/2012 | Lu et al. |
| 8,255,393 B1 | 8/2012 | Yu et al. |
| 8,260,914 B1 | 9/2012 | Ranjan |
| 8,266,215 B2 | 9/2012 | Wilson |
| 8,271,603 B2 | 9/2012 | Wilson |
| 8,463,861 B2 | 6/2013 | Oliver et al. |
| 8,484,301 B2 | 7/2013 | Wilson |
| 8,515,894 B2 * | 8/2013 | Yu ........................ H04L 51/12 706/52 |
| 8,688,794 B2 | 4/2014 | Oliver |
| 8,713,014 B1 | 4/2014 | Alspector et al. |
| 8,738,721 B1 | 5/2014 | Smirnov et al. |
| 8,918,466 B2 * | 12/2014 | Yu ........................ H04L 51/28 709/206 |
| 8,935,348 B2 | 1/2015 | Oliver |
| 9,177,293 B1 | 11/2015 | Gagnon et al. |
| 9,189,516 B2 | 11/2015 | Wilson |
| 9,325,649 B2 | 4/2016 | Oliver |
| 9,465,789 B1 * | 10/2016 | Chen .................. G06F 17/2217 |
| 9,524,334 B2 * | 12/2016 | Wilson ................ H04L 51/12 |
| 2001/0002469 A1 | 5/2001 | Bates et al. |
| 2001/0044803 A1 | 11/2001 | Szutu |
| 2001/0047391 A1 | 11/2001 | Szutu |
| 2002/0004899 A1 | 1/2002 | Azuma |
| 2002/0016735 A1 | 2/2002 | Runge et al. |
| 2002/0046275 A1 | 4/2002 | Crosbie et al. |
| 2002/0052920 A1 | 5/2002 | Umeki et al. |
| 2002/0052921 A1 | 5/2002 | Morkel |
| 2002/0087573 A1 | 7/2002 | Reuning et al. |
| 2002/0116463 A1 | 8/2002 | Hart |
| 2002/0120748 A1 * | 8/2002 | Schiavone ............ G06Q 10/107 709/227 |
| 2002/0143871 A1 | 10/2002 | Meyer et al. |
| 2002/0162025 A1 | 10/2002 | Sutton |
| 2002/0169954 A1 | 11/2002 | Bandini et al. |
| 2002/0188689 A1 | 12/2002 | Michael |
| 2002/0199095 A1 | 12/2002 | Bandini |
| 2003/0009526 A1 | 1/2003 | Bellegarda et al. |
| 2003/0023692 A1 | 1/2003 | Moroo |
| 2003/0023736 A1 | 1/2003 | Abkemeier |
| 2003/0041126 A1 | 2/2003 | Buford et al. |
| 2003/0041280 A1 | 2/2003 | Malcolm et al. |
| 2003/0046421 A1 | 3/2003 | Horvitz |
| 2003/0069933 A1 | 4/2003 | Lim |
| 2003/0083862 A1 * | 5/2003 | Hu ...................... G06F 17/2755 704/9 |
| 2003/0086543 A1 | 5/2003 | Raymond |
| 2003/0105827 A1 | 6/2003 | Tan |
| 2003/0115485 A1 | 6/2003 | Miliken |
| 2003/0120651 A1 | 6/2003 | Bernstein et al. |
| 2003/0126136 A1 | 7/2003 | Omoigui |
| 2003/0149726 A1 | 8/2003 | Spear |
| 2003/0154254 A1 | 8/2003 | Awasthi |
| 2003/0158725 A1 | 8/2003 | Woods |
| 2003/0158903 A1 | 8/2003 | Rohall et al. |
| 2003/0167311 A1 | 9/2003 | Kirsch |

(56) References Cited

U.S. PATENT DOCUMENTS

| | | |
|---|---|---|
| 2003/0195937 A1 | 10/2003 | Kircher, Jr. et al. |
| 2003/0204569 A1 | 10/2003 | Andrews et al. |
| 2003/0229672 A1 | 12/2003 | Kohn |
| 2003/0233418 A1 | 12/2003 | Goldman |
| 2004/0003283 A1 | 1/2004 | Goodman et al. |
| 2004/0008666 A1 | 1/2004 | Hardjono |
| 2004/0015554 A1 | 1/2004 | Wilson |
| 2004/0024639 A1 | 2/2004 | Goldman |
| 2004/0030776 A1 | 2/2004 | Cantrell et al. |
| 2004/0059697 A1* | 3/2004 | Forman .............. G06K 9/6228 706/46 |
| 2004/0059786 A1 | 3/2004 | Caughey |
| 2004/0083270 A1 | 4/2004 | Heckerman et al. |
| 2004/0107190 A1 | 6/2004 | Gilmour et al. |
| 2004/0117451 A1 | 6/2004 | Chung |
| 2004/0148330 A1 | 7/2004 | Alspector et al. |
| 2004/0158554 A1 | 8/2004 | Trottman |
| 2004/0162795 A1 | 8/2004 | Dougherty et al. |
| 2004/0167964 A1 | 8/2004 | Rounthwaite et al. |
| 2004/0167968 A1 | 8/2004 | Wilson |
| 2004/0177120 A1 | 9/2004 | Kirsch |
| 2004/0215963 A1 | 10/2004 | Kaplan |
| 2005/0055410 A1 | 3/2005 | Landsman et al. |
| 2005/0060643 A1* | 3/2005 | Glass .............. H04L 51/12 715/205 |
| 2005/0080855 A1 | 4/2005 | Murray |
| 2005/0081059 A1 | 4/2005 | Bandini et al. |
| 2005/0091319 A1 | 4/2005 | Kirsch |
| 2005/0125667 A1 | 6/2005 | Sullivan et al. |
| 2005/0172213 A1 | 8/2005 | Ralston et al. |
| 2005/0198160 A1 | 9/2005 | Shannon et al. |
| 2005/0198289 A1 | 9/2005 | Prakash |
| 2005/0228996 A1 | 10/2005 | Mayer |
| 2006/0010217 A1 | 1/2006 | Sood |
| 2006/0015563 A1 | 1/2006 | Judge et al. |
| 2006/0031346 A1 | 2/2006 | Zheng et al. |
| 2006/0036693 A1 | 2/2006 | Hulten et al. |
| 2006/0095521 A1 | 5/2006 | Patinkin |
| 2006/0129644 A1 | 6/2006 | Owen et al. |
| 2006/0168006 A1* | 7/2006 | Shannon .............. H04L 51/12 709/206 |
| 2006/0168019 A1 | 7/2006 | Levy |
| 2006/0235934 A1 | 10/2006 | Wilson |
| 2006/0282888 A1 | 12/2006 | Bandini et al. |
| 2007/0005564 A1 | 1/2007 | Zehner |
| 2007/0027992 A1 | 2/2007 | Judge et al. |
| 2007/0124578 A1 | 5/2007 | Paya et al. |
| 2007/0143432 A1 | 6/2007 | Klos et al. |
| 2008/0021969 A1 | 1/2008 | Oliver et al. |
| 2008/0276318 A1 | 11/2008 | Leung et al. |
| 2008/0301139 A1 | 12/2008 | Wang et al. |
| 2008/0301281 A1 | 12/2008 | Wang et al. |
| 2009/0063371 A1 | 3/2009 | Lin |
| 2009/0064323 A1 | 3/2009 | Lin |
| 2009/0110233 A1 | 4/2009 | Lu et al. |
| 2009/0220166 A1 | 9/2009 | Choi et al. |
| 2009/0262741 A1 | 10/2009 | Jungck et al. |
| 2010/0017487 A1 | 1/2010 | Patinkin |
| 2010/0017488 A1 | 1/2010 | Oliver et al. |
| 2010/0030578 A1 | 2/2010 | Siddique et al. |
| 2010/0161537 A1 | 6/2010 | Liu et al. |
| 2010/0287246 A1 | 11/2010 | Klos et al. |
| 2010/0318614 A1 | 12/2010 | Sager et al. |
| 2011/0184976 A1 | 7/2011 | Wilson |
| 2011/0191423 A1 | 8/2011 | Krasser et al. |
| 2011/0225244 A1 | 9/2011 | Levow et al. |
| 2011/0265016 A1 | 10/2011 | Koopman |
| 2011/0296524 A1 | 12/2011 | Hines et al. |
| 2012/0131118 A1 | 5/2012 | Oliver et al. |
| 2012/0131119 A1 | 5/2012 | Oliver et al. |
| 2012/0166458 A1 | 6/2012 | Laudanski et al. |
| 2012/0215892 A1 | 8/2012 | Wanser et al. |
| 2013/0173562 A1 | 7/2013 | Alspector et al. |
| 2013/0215116 A1 | 8/2013 | Siddique et al. |
| 2013/0275463 A1 | 10/2013 | Wilson |
| 2013/0318108 A1 | 11/2013 | Oliver |
| 2014/0129655 A1 | 5/2014 | Oliver |
| 2015/0213131 A1 | 7/2015 | Styler et al. |
| 2016/0078124 A1 | 3/2016 | Wilson |
| 2016/0205050 A1* | 7/2016 | Oliver .............. H04L 51/34 709/206 |
| 2016/0210602 A1 | 7/2016 | Siddique et al. |
| 2017/0103120 A1 | 4/2017 | Wilson |
| 2017/0289082 A1* | 10/2017 | Shen .............. H04L 51/22 |

OTHER PUBLICATIONS

"Digital Signature," http://www.cnet.com/Resources/Info/Glossary/Terms/digitalsignature.html last accessed Nov. 15, 2006.

"Hash Function," http://en.wikipedia.org/wiki/Hash_value, last accessed Nov. 15, 2006.

"Majordomo FAQ," Oct. 20, 2001.

Agrawal et al., "Controlling Spam Emails at the Routers," IEEE 2005.

Anon, "Challenge Messages," Mailblocks, http://support.mailblocks.com/tab_howto/Validation/detail_privacy_challenge.asp, Apr. 18, 2003.

Anon, "Cloudmark, Different Approaches to Spamfighting," Whitepaper, Version 1.0, Nov. 2002.

Anon, "Correspondence Negotiation Protocol," http://www.cs.sfu.ca/~cameron/CNP.html, Mar. 17, 2003.

Anon, "ChoiceMail FAQ," DiGiPortal Creating Order From Chaos, Support—Frequently Asked Questions, http://www.digiportal.com/support/choicemail/faq.html, Jul. 2002.

Anon, "DM Strategies Making a Living on Opt-In Email Marketing," Interactive PR & Marketing News, Feb. 19, 1999, vol. 6, Issue 4.

Anon, "Giant Company Software Announces Full Integrated AOL Support for its Popular Spam Inspector Anti-Spam Software," GIANT Company Software, Inc., Nov. 15, 2002.

Anon, "How Challenge/Response Works," http://about.mailblocks.com/challenge.html, Apr. 1, 2003.

Anon, "Project: Vipul's Razor: Summary," http://sourceforge.net/projects/razor, Jan. 12, 2002.

Anon, "Tagged Message Delivery Agent (TMDA)," http://tmda.net/index.html, Jul. 25, 2002.

Anon, "The Lifecycle of Spam," PC Magazine, Feb. 25, 2003, pp. 74-97.

Balvanz, Jeff et al., "Spam Software Evaluation, Training, and Support: Fighting Back to Reclaim the Email Inbox," in the Proc. Of the 32nd Annual ACM SIGUCCS Conference on User Services, Baltimore, MD, pp. 385-387, 2004.

Byrne, Julian "My Spamblock," Google Groups Thread, Jan. 19, 1997.

Cranor, Lorrie et al., "Spam!," Communications of the ACM, vol. 41, Issue 8, pp. 74-83, Aug. 1998.

Dwork, Cynthia et al., "Pricing via Processing or Combating Junk Mail," CRYPTO '92, Springer-Verlag LNCS 740, pp. 139-147, 1992.

Gabrilovich et al., "The Homograph Attack," Communications of the ACM, 45 (2):128, Feb. 2002.

Georgantopoulous, Bryan "MScin Speech and Language Processing Dissertation: Automatic Summarizing Based on Sentence Extraction: A Statistical Approach," Department of Linguistics, University of Edinburgh, http://cgi.di.uoa.gr/~byron/msc.html, Apr. 21, 2001.

Gomes, Luiz et al., "Characterizing a Spam Traffic," in the Proc. Of the 4th ACM SIGCOMM Conference on Internet Measurement, Sicily, Italy, pp. 356-369, 2004.

Guilmette, Ronald F., "To Mung or Not to Mung," Google Groups Thread, Jul. 24, 1997.

Hoffman, Paul and Crocker, Dave "Unsolicited Bulk Email: Mechanisms for Control" Internet Mail Consortium Report: UBE-SOL, IMCR-008, revised May 4, 1998.

Jung, Jaeyeon et al., "An Empirical Study of Spam Traffic and the Use of DNS Black Lists," IMC'04, Taormina, Sicily, Italy, Oct. 25-27, 2004.

Langberg, Mike "Spam Foe Needs Filter of Himself," Email Thread dtd. Apr. 5, 2003.

(56) References Cited

OTHER PUBLICATIONS

Lie, D.H., "Sumatra: A System for Automatic Summary Generation," http://www.carptechnologies.nl/SumatraTWLT14paper/SumatraTWLT14.html, Oct. 1999.
Mastaler, Jason "Tagged Message Delivery Agent (TMDA)," TDMA Homepage, 2003.
Maxwell, Rebecca, "Inxight Summarizer creates Document Outlines," Jun. 17, 1999, www.itworldcanada.com.
McCullagh, Declan "In-Boxes that Fight Back," News.com, May 19, 2003.
Prakash, Vipul Ved "Razor-agents 2.22," http://razor.sourceforge.net, Aug. 18, 2000.
Skoll, David F., "How to Make Sure a Human is Sending You Mail," Google Groups Thread, Nov. 17, 1996.
Spamarrest, The Product, How it Works, http://spamarrest.com/products/howitworks.jsp, Aug. 2, 2002.
SpamAssassin, "Welcome to SpamAssassin," http://spamassassin.org, Jan. 23, 2003.
Templeton, Brad "Viking-12 Junk E-Mail Blocker," (believed to have last been updated Jul. 15, 2003).
Von Ahn, Luis et al., "Telling Humans and Computers Apart (Automatically) or How Lazy Cryptographers do AI," Communications to the ACM, Feb. 2004.
Weinstein, Lauren "Spam Wars," Communications of the ACM, vol. 46, Issue 8, p. 136, Aug. 2003.
PCT Application No. PCT/US04/05172 International Search Report and Written Opinion dated Dec. 7, 2004, 9 pages.
U.S. Appl. No. 11/903,413 Office Action dated Oct. 27, 2009.
U.S. Appl. No. 13/360,971 Office Action dated Aug. 13, 2013.
U.S. Appl. No. 14/152,812 Office Action dated May 8, 2015.
U.S. Appl. No. 10/371,987 Final Office Action dated Jun. 27, 2008.
U.S. Appl. No. 10/371,987 Office Action dated Nov. 28, 2007.
U.S. Appl. No. 10/371,987 Final Office Action dated Jul. 6, 2007.
U.S. Appl. No. 10/371,987 Office Action dated Jan. 12, 2007.
U.S. Appl. No. 10/371,987 Final Office Action dated Aug. 10, 2006.
U.S. Appl. No. 10/371,987 Office Action dated Nov. 30, 2005.
U.S. Appl. No. 10/371,987 Final Office Action dated Jun. 6, 2005.
U.S. Appl. No. 10/371,987 Office Action dated Sep. 30, 2004.
U.S. Appl. No. 10/616,703 Office Action dated Nov. 28, 2007.
U.S. Appl. No. 10/616,703 Final Office Action dated Sep. 19, 2007.
U.S. Appl. No. 10/616,703 Office Action dated Apr. 9, 2007.
U.S. Appl. No. 11/455,037 Final Office Action dated Feb. 15, 2012.
U.S. Appl. No. 11/455,037 Office Action dated Oct. 28, 2011.
U.S. Appl. No. 11/455,037 Final Office Action dated Jan. 18, 2008.
U.S. Appl. No. 11/455,037 Office Action dated Jul. 17, 2007.
U.S. Appl. No. 11/455,037 Final Office Action dated Feb. 13, 2007.
U.S. Appl. No. 11/455,037 Office Action dated Oct. 20, 2006.
U.S. Appl. No. 11/926,819 Final Office Action dated Mar. 5, 2010.
U.S. Appl. No. 11/926,819 Office Action dated Jun. 25, 2009.
U.S. Appl. No. 11/927,497 Office Action dated Sep. 4, 2008.
U.S. Appl. No. 12/502,189 Final Office Action dated Aug. 2, 2011.
U.S. Appl. No. 12/502,189 Office Action dated Aug. 17, 2010.
U.S. Appl. No. 13/015,526 Office Action dated Aug. 10, 2012.
U.S. Appl. No. 13/361,659 Final Office Action dated Jul. 17, 2012.
U.S. Appl. No. 13/361,659 Office Action dated Mar. 16, 2012.
U.S. Appl. No. 13/912,055 Final Office Action dated Mar. 3, 2015.
U.S. Appl. No. 13/912,055 Office Action dated Nov. 7, 2014.
U.S. Appl. No. 13/913,413 Office Action dated May 13, 2014.
U.S. Appl. No. 14/938,573 Office Action dated Apr. 8, 2016.
U.S. Appl. No. 15/385,399 Office Action dated Apr. 24, 2017.

* cited by examiner

METHOD AND APPARATUS FOR CLASSIFYING ELECTRONIC MESSAGES

CROSS REFERENCE TO RELATED APPLICATIONS

The present application is a continuation and claims the priority benefit of U.S. patent application Ser. No. 14/152,812 filed Jan. 10, 2014, now U.S. Pat. No. 9,325,649, which is a continuation and claims the priority benefit of U.S. patent application Ser. No. 13/360,971 filed Jan. 30, 2012, now U.S. Pat. No. 8,688,794, which is a continuation and claims the priority benefit of U.S. patent application Ser. No. 11/903,413 filed Sep. 20, 2007, now U.S. Pat No. 8,112,486, which is a continuation and claims the priority benefit of U.S. patent application Ser. No. 10/371,977 filed Feb. 20, 2003, now U.S. Pat No. 7,299,261. The disclosures of the aforementioned applications are incorporated herein by reference.

This application is related to U.S. patent application Ser. No. 10/371,987 filed Feb. 20, 2003. The disclosure of the aforementioned application is incorporated herein by reference.

BACKGROUND OF THE INVENTION

Field of the Invention

The present invention relates generally to message classification. More specifically, a system and method for classifying messages to block junk email messages (spam) are disclosed.

Description of Related Art

People have become increasingly dependent on email for their daily communication. Email is popular because it is fast, easy, and has little incremental cost. Unfortunately, these advantages of email are also exploited by marketers who regularly send out large amounts of unsolicited junk email (also referred to as "spam"). Spam messages are a nuisance for email users. They clog people's email box, waste system resources, often promote distasteful subjects, and sometimes sponsor outright scams.

There have been efforts to block spam using spam-blocking software in a collaborative environment where users contribute to a common spam knowledge base. For privacy and efficiency reasons, the spam-blocking software generally identifies spam messages by using a signature generated based on the content of the message. A relatively straightforward scheme to generate a signature is to first remove leading and trailing blank lines then compute a checksum on the remaining message body. However, spam senders (also referred to as "spammers") have been able to get around this scheme by embedding variations—often as random strings—in the messages so that the messages sent are not identical and generate different signatures.

Another spam-blocking mechanism is to remove words that are not found in the dictionary as well as leading and trailing blank lines, and then compute the checksum on the remaining message body. However, spammers have been able to circumvent this scheme by adding random dictionary words in the text. These superfluous words are sometimes added as white text on a white background, so that they are invisible to the readers but nevertheless confusing to the spam-blocking software.

The existing spam-blocking mechanisms have their limitations. Once the spammers learn how the signatures for the messages are generated, they can alter their message generation software to overcome the blocking mechanism. It would be desirable to have a way to identify messages that cannot be easily overcome even if the identification scheme is known. It would also be useful if any antidote to the identification scheme were expensive to implement or would incur significant runtime costs.

SUMMARY OF THE PRESENTLY CLAIMED INVENTION

Systems and methods of the present invention provide for processing e-mail messages. A message may be processed to generate a message summary by removing or replacing certain words, phrases, sentences, punctuation, and the like. For example, redundant words may be removed. Message signatures based upon the message summary may be generated and stored in a signature database, which may be used to identify and/or classify spam messages, Subsequently received messages may be classified using signatures based on message summaries and processed based on classification.

Methods of the present invention may include removing non-useful words from the message or replacing the remaining words with canonical equivalent words. The resulting summary may then be transferred to a signature generation engine. The signature generation engine may generate one or more signatures based on the resulting summary. The signatures may be used to classify subsequently received messages, which may then be processed based on their classification. Some embodiments of the present invention further include storing the signatures in a signature database.

Systems of the present invention may include a signature database, a server, and a mail device comprising a summarization and signature generation module. The summarization and signature generation module generates message summaries from a message and generates one or more message signatures based on the resulting summary. The message signatures may be stored in the signature database and used by the server to identify and classify subsequently received messages. The server is further configured to process the subsequently received messaged based on the classification.

An embodiment of the present invention may include computer storage media that include instructions for processing messages to generate message summaries and message signatures based on the message summary. Further embodiments may include instructions for storing the message summaries in a signature database.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

It should be appreciated that the present invention can be implemented in numerous ways, including as a process, an apparatus, a system, or a computer readable medium such as a computer readable storage medium or a computer network wherein program Instructions are sent over optical or electronic communication links. It should be noted that the order of the steps of disclosed processes may be altered within the scope of the invention.

A detailed description of one or more preferred embodiments of the invention is provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

An improved system and method for classifying mail messages are disclosed. In one embodiment, the message is processed to construct a summary that transforms information in the message into a condensed canonical form. A set of signatures is generated based on the summary. In some embodiments, the distinguishing properties in the message are extracted also and used in combination with the summary to produce signatures. The signatures for junk messages are stored in a database and used to classify these messages.

Figure 1:
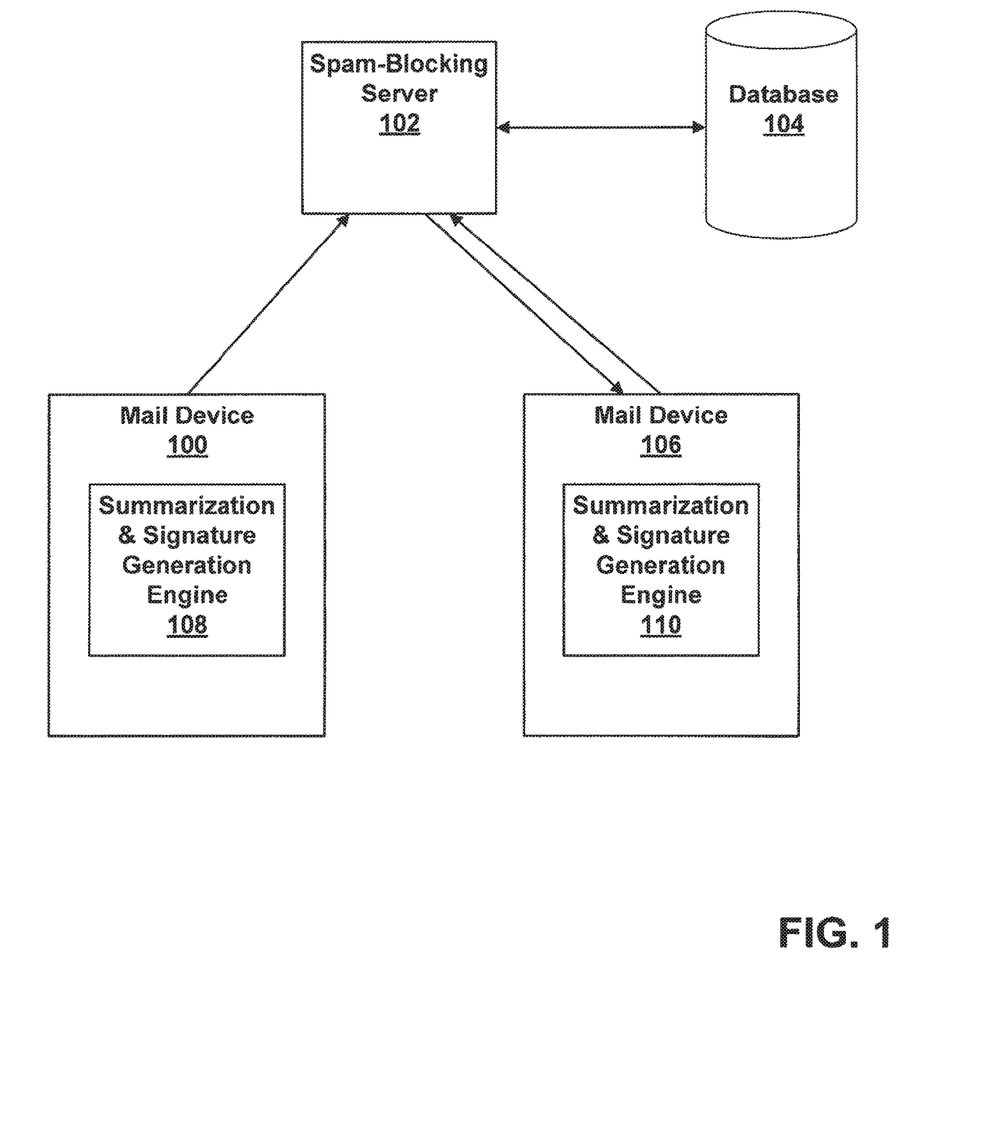
FIG. 1 is a block diagram illustrating a spam message classification network according to one embodiment of the present invention.

FIG. 1 is a block diagram illustrating a spam message classification network according to one embodiment of the present invention. The system allows users in the network to collaborate and build up a knowledge base of known spam messages, and uses this knowledge to block spam messages. A spam message is first sent to a mail device 100. The mail device may be a mail server, a personal computer running a mail client, or any other appropriate device used to receive email messages. A user reads the message and determines whether it is spam.

If the message is determined to be spam, a summarization and signature generation engine 108 on the mail device summarizes the message and generates one or more signatures (also referred to as thumbprints) based on the summarized message. The summarization and signature generation engine may be a separate program or part of the mail-processing program on the mail device. The signature is sent to a spam-blocking server 102, which stores the signature in a database 104. Different types of databases are used in various embodiments, including commercial database products such as Oracle databases, files, or any other appropriate storage that allow data to be stored and retrieved. In some embodiments, the database also keeps track of the number of times a signature has been identified as spam by other users of the system. The database may be located on the spam-blocking server device, on a network accessible by server 102, or on a network accessible by the mail devices. In some embodiments, the database is cached on the mail devices and updated periodically.

When a mail device 106 receives a message, the mail device's summarization and signature generation engine 110 summarizes the message, generates one or more signatures for the message, and sends the signatures along with any other query information to the spam-blocking server. The spam-blocking server looks up the signatures in the database, and replies with information regarding the signatures. The information in the reply helps mail device 106 determine whether the message is spam.

Mail device 106 may be configured to use information from the spam-blocking server to determine whether the message is spam in different ways. For example, the number of times the message was classified by other users as spam may be used. If the number of flags exceeds some preset threshold, the mail device processes the message as spam. The number and types of matching signatures and the effect of one or more matches may also be configured. For example, the message may be considered spam if some of the signatures in the signature set are found in the database or the message may be determined to be spam only if all the signatures are found in the database.

In some embodiments, spam-blocking server 102 acts as a gateway for messages. The server includes a summarization and signature generation engine similar to the engine included in a mail device. Incoming messages are received by the server, which performs summarization and signature generation on the message. The server looks up the signature in the database, and processes the message according to the result of the lookup.

Since spam-blocking software can easily detect identical spam messages, spammers often send out many variations on the same message to avoid detection. They may switch the location of sentences and paragraphs, insert random words, or use different words and phrases. The key information conveyed in these variations of messages, however, stays about the same. The summarization and signature generation engine distills the information in the messages and produces a summary.

During the summarization process, words that are not useful are discarded. Examples of non-useful words include commonly occurring words such as "a", "an", "the", "to" and other selected words that are not considered helpful for the purpose of distinguishing the message (also referred to as stop words), and sentences or passages that spammers insert on purpose.

The remaining words and phrases are replaced with their canonical equivalents. The canonical equivalent of a word or a phrase is an identifier used to represent all synonyms of the word or phrase, which may be a word, a phrase, a value, a letter or any other appropriate representation. Redundant information is then removed, and words are optionally ranked and selected based on their importance. There are many different ways of evaluating the importance of words, such as ranking words based on their probability of occurrence in spam messages, probability of occurrence in natural language, or combinations thereof.

The resulting summary is a condensed, canonical form of a message. Thus, different messages that have the same or equivalent information have the same summary, and can be more easily identified using such a summary. Using a summary to identify and classify messages makes it harder for spammers to alter their message generation scheme to evade detection. It is rather unlikely that messages other than those sent by the same spammer would have the same summary. Therefore, the risk of false classification is reduced.

Figure 2:
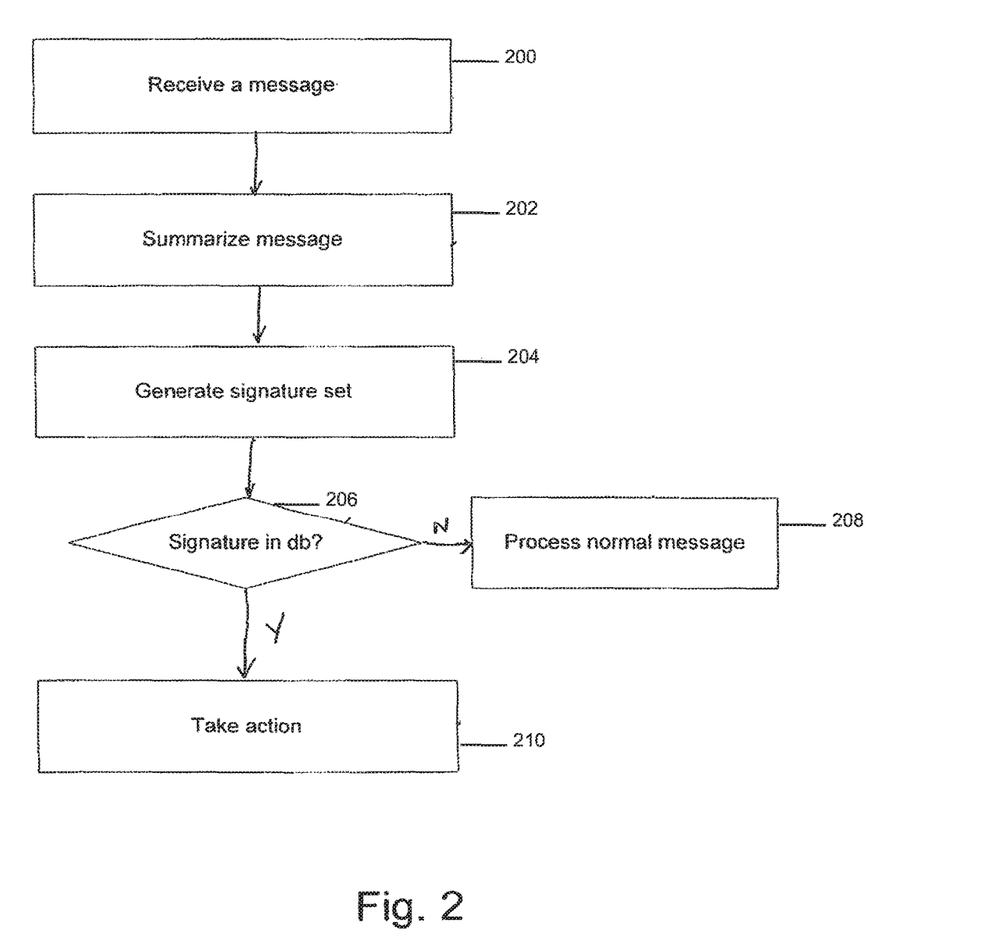
FIG. 2 is a flowchart illustrating how a message is classified, according to one embodiment of the present invention.

FIG. 2 is a flowchart illustrating how a message is classified, according to one embodiment of the present invention. First, a message is received (200). The message is processed to produce a summary (202). One or more signatures are generated based on the summary (204), and then looked up in a database (206). If the signatures are not found in the database, then no user has classified the message as spam and the system can proceed to process the message as a normal message, delivering the message or displaying it when appropriate (208). If, however, the signatures are found in the database, then the same message or a message similar to it has been classified as spam. Some appropriate action is taken accordingly (210). In an embodiment where the process takes place on a mail client, the action includes classifying the message as spam and moving it to an appropriate junk folder. In an embodiment where the process takes place on a mail server, the action includes quarantining the message so it is recoverable by the administrator or the user.

Sometimes, a spam message is delivered to the user's inbox because the signature of the message summary is not found in the database. This may happen the first time a particular spam message is sent, when the message is yet to be classified as spam by a sufficient number of users on the network, or when not enough variants of the message have been identified. The user who receives the message can then make a contribution to the database by indicating the message as spam. In one embodiment, the mail client software includes a "junk" button in its user interface. The user can click on this button to indicate that a message is junk. Without further action from the user, the software automatically extracts information from the message, submits the information to the server, and deletes the message from the user's inbox. In some embodiments, the mail client software also updates the user's configurations accordingly, For instance, the software may add the sender's address to a blacklist. The blacklist is a list of addresses used for blocking messages, Once an address is included in the blacklist, future messages from that address are automatically blocked.

Figure 3:
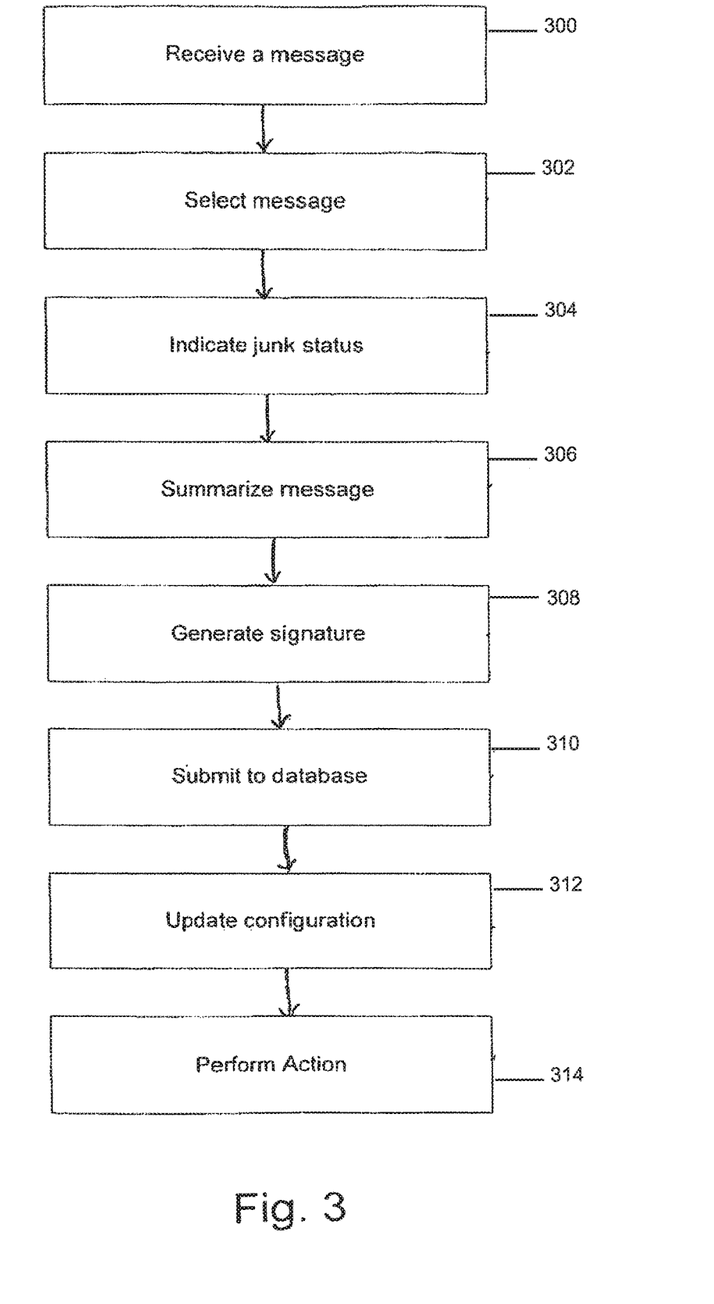
FIG. 3 is a flowchart illustrating how a user classifies a message as spam, according to one embodiment of the present invention.

FIG. 3 is a flowchart illustrating how a user classifies a message as spam according to one embodiment of the present invention. A spam message is received by the user (300). The user selects the message (302), and indicates that the message is junk by clicking on a junk button or some other appropriate means (304). The summarization and signature generation engine summarizes the message (306), and generates a set of signatures based on the summary (308). The signatures, which are used to identify the message, are submitted to the database (31Q). Thus, matching signatures can be found in the database for messages that have the same summary. In some embodiments, the configuration of the user's mail client software is updated based on the classification (312). For example, the sender's address is added to a blacklist for blocking future messages from the same sender. An action is performed on the message accordingly (314). A variety of actions may be performed, including deleting the message from the user's inbox, rejecting or bouncing the message, quarantining the message, etc.

Figure 4:
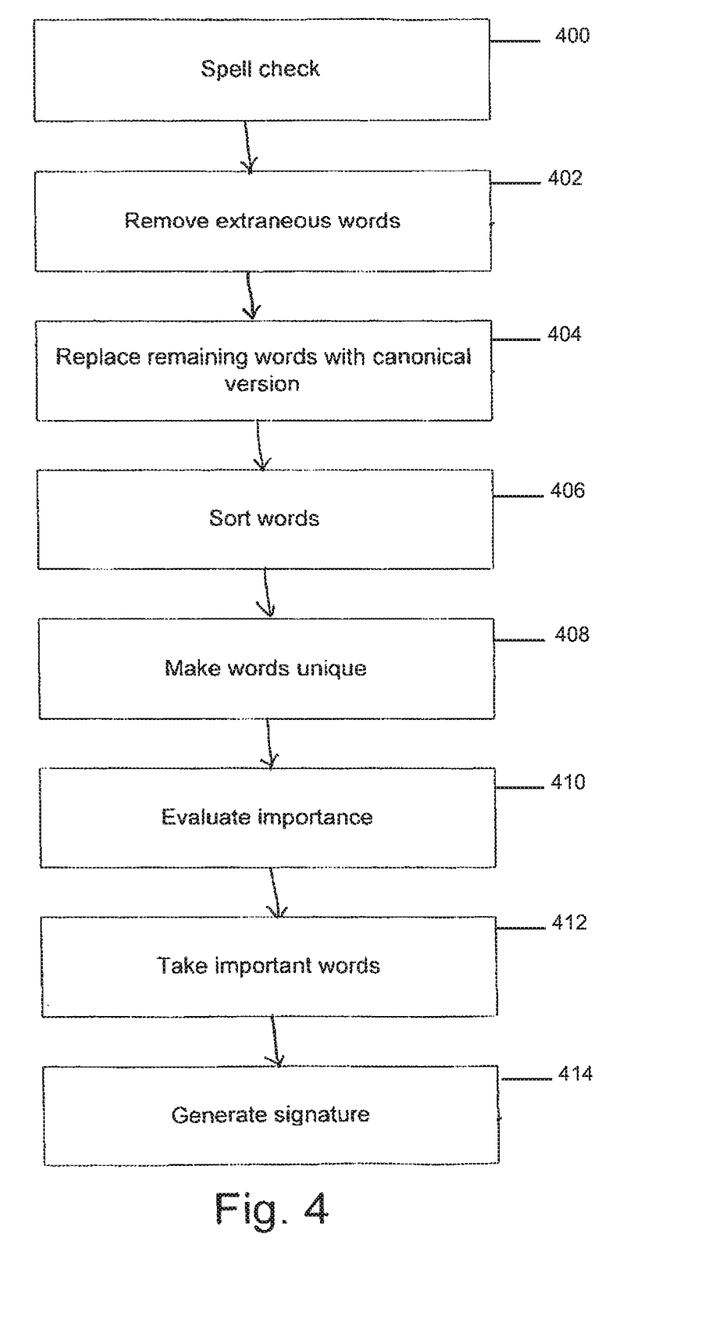
FIG. 4 is a flowchart illustrating the summarization process according to one embodiment of the present invention.

FIG. 4 is a flowchart illustrating the summarization process according to one embodiment of the present invention. A spell check is performed on the message (400). Incorrectly spelled words are corrected; the ones that are not correctable are discarded. In some embodiments, exceptions are made for items that may not be found in the dictionary for legitimate reasons, such as URLs and email addresses.

After the spell check, extraneous information such as stop words that are not useful for distinguishing the message are removed from the message (402). The summarization and signature generation engine uses a collection of stop words to find words that should be removed from the message. Sometimes, spammers include random sentences and passages such as Shakespearean sonnets in spam messages in attempts to evade detection. Thus, in some embodiments, the engine also includes sentences and passages that are known to be often included by spammers, and uses these well-known sentences and passages to remove extraneous words. Removing extraneous words from the message helps simplify the sentence structure and reduces the number of words to be further processed. In some embodiments, punctuations, tabs, or blank lines are also removed. Steps 400 and 402 are preprocessing steps that put the message into a better form for further processing. Upon the completion of steps 400 and 402, the message has been reduced to a list of corrected words that excludes certain words not useful for distinguishing the message.

The remaining words are looked up in a thesaurus or any other collection that organizes words into groups according to their meanings. Each group includes similar words and phrases, and has a word or phrase that is the canonical equivalent of all the words and phrases in the group. The term "canonical equivalent" means the word or phrase that is selected to represent the group of words where the word or phrase has been found. In some embodiments, the canonical equivalent is not itself a word or phrase but is simply an identifier such as a number or letter that identifies the list where the word or phrase from the message is found. The remaining words in the message are then replaced with their canonical equivalents (404). It should be noted that in different embodiments only words may be looked up or some words may be combined into phrases for lookup. The remainder of this description refers to words only for the purpose of clarity. It should be noted that the same principles apply to phrases and that principles apply whether a canonical word is selected in (404) or an identifier of the word group is selected.

Sometimes, a word has multiple meanings. The canonical equivalent of the word is selected from multiple groups of words using a predefined process. In some embodiments, the canonical equivalent that is most likely to occur in spam messages is selected. For example, the word "flies" has two canonical equivalents according to a thesaurus, "air travel" and "insect." Since there are many spam messages related to air travel and relatively fewer related to insects, "fly" is more likely to be what is intended by the spammer and is therefore chosen over "insect." In some embodiments, all the canonical equivalents are added to the list. Using the previous example, both "fly" and "insect" are added to the list. In some embodiments, the meaning that occurs in the language most frequently is chosen.

The canonical equivalent words (or identifiers) are then sorted (406). There are sometimes multiple instances of the same word. Duplicates are removed to make the words unique (408). The importance of the words is evaluated (410), and some of the more. important words are chosen (412). It should be noted that steps 406-412 are optional, and some or all of them may be omitted in different embodiments. There are many different ways to evaluate the importance of words. In some embodiments, the importance of words is determined by their probability of occurrence in spam messages. Concepts that typically appear in spam messages are ranked higher. For example, "credit", "finance", "sex" are popular spam ideas and thus receive high ranking. In some embodiments, words are ranked based on their probability of occurrence in the language. In some embodiments, a combination of techniques is used. The importance ranking of the words is kept separately in some embodiments, and used to rearrange the list of words in some embodiments. This process produces a summary that includes the resulting words.

The summarization and signature generation engine takes the summary to generate a set of signatures (414). There are many ways to generate the signatures using the summary. In some embodiments, a transform function (such as a secure hash function or a checksum) is applied to the bytes in the summary to produce a single signature. In some embodiments, the transform function is applied to words in the summary to produce a set of signatures including a plurality of signatures. In some embodiments, no transformation is applied to the summary and the signature is set to be the summary.

Sometimes the summary must meet a certain minimum byte requirement to generate the signatures." In some embodiments, the entire summary or the words in the summary are discarded if they have fewer than a predefined number of bytes. Thus, the probability of signature collision is lowered.

For the purposes of example, a spam message is examined and summarized using the process described in FIG. 4. The original message is as follows:

"Dear Bob,

I am a Nigerian widoew. I have 26 million dollars in a bank in Nigeria that I need to tran:sfer to an U.S. bank account. Please send me your bank account number so I can transfer the monney, and you may keep 1 million dollars for yourself."

First, the spell check corrects widoew to widow, and monney to money.

After removing the non-essential words, the words that are left are: Bob, Nigerian, widow, 26, million, dollars, bank, Nigeria, need, transfer, U.S., bank, account, send, bank, account, number, transfer, money, keep, 1, million, dollars.

After replacing those words with their canonical equivalents, the new words are: name, third-world country, widow, number, large number, money, bank, first-world country, need, financial transaction, third-world country, bank, account, send; bank, account, number, financial transaction, money, keep, number, large number, money.

The words are sorted, and the new word list is as follows: account, account, bank, bank, bank, financial transaction, financial transaction, first-world country, keep, large number, large number, money, money, money, name, need, number, number, number, send, third-world country, third-world country, widow.

The words are then made unique to form the following list: account, bank, financial transaction, first-world country, keep, large number, money, name, need, number, send, third-world country, widow.

The importance of the words is then evaluated, and the more important words receive greater values. The resulting list shows the ranking values in parentheses: account (15), bank (12), financial transaction (16), first-world country (10), keep (8), large number (13), money (20), name (4), need (9), number (12), send (11), third-world country (12), widow (15). The important words are then chosen. In some embodiments, a predefined number of words with the highest ranking may be chosen. In some embodiments, a variable number of words that meet a certain importance ranking may be chosen. In this embodiment, the ten words that have the highest, importance ranking are chosen; they are: account, bank, financial transaction, first-world country, large number, money, number, send, third-world country, widow. Generally, messages that are variations on the same theme of a widow conducting financial transaction on bank account between first-world country and third-world country should have similar canonical form. These words are then used to generate one or more signatures. As noted above, instead of words, the list may comprise a set of identifiers in, for example, numerical order, that represent the categories of words or phrases occurring most often in the message. Also, in some embodiments, other criteria are used to select the list including probability of occurrence in a message of a category of words.

Some embodiments of the system employ other summarization techniques, such as the topic specific summarization technique described in MSc in Speech and Language Processing Dissertation: Automatic summarizing based on sentence extraction: A statistical approach by Byron Georgantopoulos and the neural net based technique described in Sumatra: A system for Automatic Summary Generation by D. H. Lie. In some embodiments, the summarization and signature generation engine provides interfaces to utilize a summarization module. The summarization module, which may be provided by a third-party, produces summaries for text inputs.

The summarization technique is sometimes combined with the distinguishing properties identification technique described in U.S. patent application Ser. No. 10/371,987 filed Feb. 20, 2003 and entitled "Using Distinguishing Properties to Classify Messages," the disclosure of which has been previously incorporated by reference. In one embodiment, the summarization technique is applied to produce one or more signatures, and distinguishing properties such as contact information embedded in the message are identified to produce additional signatures.

The generated signatures are transferred and stored in the database. In one embodiment, the signatures are formatted and transferred using extensible markup language (XML). In some embodiments, the signatures are correlated and the relationships among them are also recorded in the database. For example, if signatures from different messages share a certain signature combination, other messages that include the same signature combination may be classified as spam automatically. In some embodiments, the number of-times each signature has been sent to the database is updated.

Using signatures to identify a message gives the system greater flexibility and allows it to be more expandable. For example, the mail client software may only identify one type of distinguishing property in its first version. In later versions, new types of distinguishing properties are added. The system can be upgraded without requiring changes in the spam-blocking server and the database.

An improved system and method for classifying a message have been disclosed. The message is processed to generate a summary that is a condensed, canonical form of the message. One or more signatures are generated based on the summary. Signatures of spam messages are stored in a database to effectively block spam messages.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method for processing electronic messages (e-mails) is provided, the method comprising:

receiving an electronic message, wherein the received electronic message includes a sender's address;

comparing the sender's address associated with the electronic message to sender addresses found on a blacklist that contains a plurality of sender addresses and signatures of previously sent spam;

executing instructions stored in memory, wherein the instructions are executed by a processor to:

receive user input that classifies the received electronic message when the sender's address for the received electronic message is not found within the blacklist, and update the blacklist based on the received user input, wherein updating the blacklist comprises:

summarizing content of the received electronic message, wherein summarizing the content of the received electronic message includes identifying that the content includes at least one word that has a plurality of possible canonical equivalents, selecting one of the equivalents for the at least one word based on likely association with the spam, assigning a probability of occurrence to the at least one word in the received electronic message, and the probability of occurrence corresponding to a probability that the at least one word occurs in a language, generating one or more signatures for the received electronic message based on the summarized content, and associating the generated signatures with the sender's address, and process the received electronic message based on the blacklist and based on the selected equivalent most likely being associated with the spam.

2. The method of claim 1, wherein processing the received message includes blocking the received electronic message when the sender's address is found on the blacklist.

3. The method of claim 1, wherein the updating further includes spell checking the content of the received electronic message.

4. The method of claim 3, wherein the spell checking of the content of the received electronic message includes correcting misspelled words and discarding misspelled words that are not correctible.

5. The method of claim 4, wherein the discarding misspelled words that are not correctible includes exceptions that include URLs and email addresses.

6. The method of claim 1, wherein summarizing content of the received electronic message includes removing extraneous information from received electronic message.

7. The method of claim 6, wherein extraneous information that is removed includes a list of stop words, words found in commonly used sentences or phrases by known spammers, punctuations, tabs, and blank lines.

8. The method of claim 1, wherein summarizing content of the received electronic message includes replacing one or more words found in the received electronic message with the selected canonical equivalent.

9. The method of claim 8, wherein the replacing of one or more words includes replacing a combination of two or more words with the selected canonical equivalent.

10. The method of claim 8, wherein summarizing content of the received electronic message includes ranking each of the canonical equivalents based on a probability that each canonical equivalent being used is associated with the spam.

11. The method of claim 1, wherein generating the signature includes using a transform function on the summarized content.

12. The method of claim 1, wherein generating the signature requires that the summarized content of the received electronic message be a pre-determined size.

13. A non-transitory computer-readable storage medium having embodied thereon a program executable by a processor for implementing a method for processing electronic messages (e-mails) is provided, the method comprising:

receiving an electronic message, wherein the received electronic message includes a sender's address;

comparing the sender's address associated with the electronic message to sender addresses found on a blacklist that contains a plurality of sender addresses and signatures of previously sent spam, receiving user input that classifies the received electronic message when the sender's address for the received electronic message is not found within the blacklist, updating the blacklist based on the received user input, wherein updating the blacklist comprises:

summarizing content of the received electronic message, wherein summarizing the content of the received electronic message includes identifying that the content includes at least one word that has a plurality of possible canonical equivalents, selecting one of the equivalents for the at least one word based on likely association with the spam, and assigning a probability of occurrence to at least one word in the received electronic message, and the probability of occurrence corresponding to a probability that the at least one word occurs in a language, generating one or more signatures for the received electronic message based on the summarized content, and associating the generated signatures with the sender's address; and processing the received electronic message based on the blacklist and based on the selected equivalent most likely being associated with the spam.

14. The non-transitory computer-readable storage medium of claim 13, wherein processing the received message includes blocking the received electronic message when the sender's address is found on the blacklist.

15. The non-transitory computer-readable storage medium of claim 13, wherein the updating further includes spell checking the content of the received electronic message.

16. The non-transitory computer-readable storage medium of claim 15, wherein the spell checking of the content of the received electronic message includes correcting misspelled words and discarding misspelled words that are not correctible.

17. The non-transitory computer-readable storage medium of claim 16, wherein the discarding misspelled words that are not correctible includes exceptions that include URLs and email addresses.

18. The non-transitory computer-readable storage medium of claim 13, wherein summarizing content of the received electronic message includes removing extraneous information from received electronic message.

19. The non-transitory computer-readable storage medium of claim 18, wherein extraneous information that is removed includes a list of stop words, words found in commonly used sentences or phrases by known spammers, punctuations, tabs, and blank lines.

20. An apparatus for processing electronic messages (e-mails) is provided, the apparatus comprising:
- a network interface that receives receiving an electronic message, wherein the received electronic message includes a sender's address;
- a memory; and
- a processor that executes instructions stored in memory, wherein execution of the instructions by the processor:
  - compares the sender's address associated with the electronic message to sender addresses found on a blacklist that contains a plurality of sender addresses and signatures of previously sent spam,
  - receives user input that classifies the received electronic message when the sender's address for the received electronic message is not found within the blacklist, and
  - updates the blacklist based on the received user input, wherein updating the blacklist comprises:
    - summarizing content of the received electronic message, wherein summarizing the content of the received electronic message includes identifying that the content includes at least one word that has a plurality of possible canonical equivalents, selecting one of the equivalents for the at least one word based on likely association with the spam, assigning a probability of occurrence to at least one word in the received electronic message, and the probability of occurrence corresponding to a probability that the at least one word occurs in a language,
    - generating one or more signatures for the received electronic message based on the summarized content, and
    - associating the generated signatures with the sender's address, and
  - processes the received electronic message based on the blacklist and based on the selected equivalent most likely being associated with the spam.

* * * * *